3,282,844
MINERAL LUBRICATING OIL COMPOSITIONS CONTAINING POLY (10-PINANYLMETHYL METHACRYLATE)
Alfred E. Borchert, Cherry Hill, N.J., and Anne M. Karrash, Allentown, Pa., assignors to The Atlantic Refining Company, Philadelphia, Pa., a corporation of Pennsylvania
No Drawing. Filed Dec. 10, 1964, Ser. No. 417,519
4 Claims. (Cl. 252—57)

This invention relates to methacrylates and polymers thereof. More particularly, this invention relates to 10-pinanylmethyl methacrylate and the polymers thereof.

The monomer is prepared by hydrogenating 10-pinenylmethanol (nopol) in the presence of an Adam's catalyst. The saturated alcohol (hydronopol) is then converted to the methacrylate ester by reaction with methacrylyl halide.

The 10-pinanylmethyl methacrylate is then polymerized by either solution or suspension polymerization techniques. This polymer is useful as an oil viscosity index improver and in other applications which utilize polymethacrylates.

The reactions referred to above may be represented as follows:

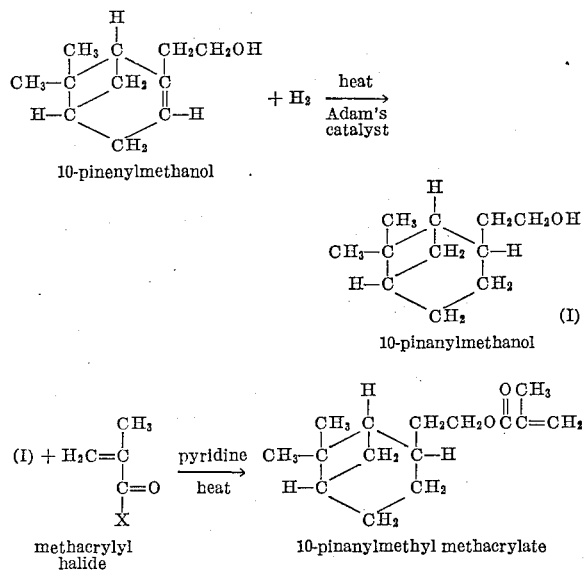

EXAMPLE I

*Preparation of 10-pinanylmethyl methacrylate*

200 grams (1.2 mols.) of 10-pinenylmethanol were hydrogenated over 2 grams of platinum dioxide. The initial temperature was 70° F. and the initial hydrogen pressure was 3,000 p.s.i. The temperature was then raised to 285° F. until essentially all of the alcohol was saturated. This saturated alcohol was isolated by distillation. It had a boiling range of 90° to 110° C. (<.5 mm. pressure) and a refractive index of 1.488 at 25° C. It was identified as 10-pinanylmethanol.

178 grams (0.75 mol.) of 10-pinanylmethyl methacrylate were prepared by dropwise addition of 117 grams (1.12 mols.) of methacrylyl chloride to a benzene solution containing 174 grams (1.03 mols.) of 10-pinanylmethanol and 47 grams of pyridine at a reaction temperature of 50° C.

The 10-pinanylmethyl methacrylate had the following properties:

| | |
|---|---:|
| Boiling range (<.5 mm. pressure, ° C.) | 94–106 |
| Refractive index at 25° C. | 1.4819 |
| Specific gravity 25° C./4° C. | .997 |
| Carbon contents, percent | 75.9 |
| (calculated, percent) | 76.2 |
| Hydrogen content, percent | 10.1 |
| (calculated, percent) | 10.2 |

EXAMPLE II

*a. Solution polymerization*

50 grams (0.21 mol.) of 10-pinanylmethyl methacrylate from Example I and 0.25 gram of azobisisobutyronitrile were reacted in 444 grams of benzene diluent at 60° C. for 18 hours under a nitrogen atmosphere. The polymer was isolated by addition of the benzene solution to excess methanol whereupon 33 grams of a colorless product were obtained. This product had a softening range of 75 to 80° C., a reduced viscosity of .31 (5% in tetrahydrofuran at 30° C.) and was identified as poly(10-pinanylmethyl methacrylate).

*b. Suspension polymerization*

The following mixture was suspended in a bottle containing 196 grams of deionized water and agitated at 60° C. for 18 hours:

| | Grams |
|---|---:|
| 10-pinanylmethyl methacrylate | 99 |
| Azobisisobutyronitrile | .5 |
| Potassium persulfate | .62 |
| Tricalcium phosphate | 1.5 |

The beaded product was thoroughly washed with water and dried under a vacuum at 60° C. 91 grams of poly (10-pinanylmethyl methacrylate) were obtained.

The polymers from Example II were evaluated in mineral oil as viscosity index improvers. Unexpectedly, it was found that although the polymers were only slightly soluble in the oil, the addition of small soluble amounts greatly increased the viscosity index. In order to obtain the same degree of improvement with the other viscosity index improvers, amounts greater than 1% by weight are required.

EXAMPLE III

The polymers of Example II were dissolved in a solvent refined oil by heating. The resulting solutions were filtered to remove any insoluble polymer.

The results are as follows.

| System: | Viscosity index |
|---|---:|
| Solvent refined lubricating oil (100 SUS at 100° F.) | 103.0 |
| With .22 percent by weight poly(10-pinanylmethyl methacrylate) | 149.0 |
| With .36 percent by weight poly(10-pinanylmethyl methacrylate) | 166.5 |
| Solvent refined oil (151 SUS at 100° F.) | 107.5 |
| With .15 percent by weight poly(10-pinanylmethyl methacrylate) | 135.0 |

The maximum polymer loading is limited by its solubility in the particular mineral oil utilized. For most of commonly-used mineral oils this solubility will not exceed .75 percent by weight polymer in oil.

We claim:
1. A lubricating oil composition comprising a major amount of mineral lubricating oil and an oil-soluble minor amount of poly(10-pinanylmethyl methacrylate).
2. A composition according to claim 1 wherein the poly(10-pinanylmethyl methacrylate) is present in an amount not exceeding 0.75 weight percent.
3. A composition according to claim 2 wherein the poly(10-pinanylmethyl methacrylate) is present in an amount from 0.15 to 0.75 weight percent.
4. A composition according to claim 3 wherein the poly(10-pinanylmethyl methacrylate) is present in an amount from 0.15 to 0.36 weight percent.

References Cited by the Examiner
UNITED STATES PATENTS

| | | | |
|---|---|---|---|
| 2,363,044 | 11/1944 | Clifford | 260—89.5 |
| 2,407,954 | 9/1946 | Fenske et al. | 252—56 |
| 2,704,277 | 3/1955 | Giammaria | 252—57 X |
| 2,929,806 | 3/1960 | Marvel et al. | 260—486 X |

OTHER REFERENCES

Blomquist et al.: "Jour. American Chem. Society," vol. 79 (1957) pp. 4976–4980 (QD1A5).

DANIEL E. WYMAN, *Primary Examiner.*

W. H. CANNON, *Assistant Examiner.*